United States Patent [19]

Ignasiak

[11] Patent Number: 5,563,756
[45] Date of Patent: Oct. 8, 1996

[54] RESETTABLE GROUND FAULT CIRCUIT INTERRUPTER

[76] Inventor: Martin C. Ignasiak, 4482 Baccharis Way, Sarasota, Fla. 34242

[21] Appl. No.: 210,555

[22] Filed: Mar. 18, 1994

[51] Int. Cl.⁶ .................................................. H02H 9/08
[52] U.S. Cl. ............................ 361/42; 361/115; 335/18
[58] Field of Search ................... 335/18, 42; 361/42–50, 361/115, 160, 170, 142, 187, 206, 819

[56] References Cited

U.S. PATENT DOCUMENTS

| | | | |
|---|---|---|---|
| 3,873,951 | 3/1975 | Blake | 335/164 |
| 4,893,101 | 1/1990 | Robitaille | 335/18 |
| 5,173,673 | 12/1992 | Weigand et al. | 335/18 |

*Primary Examiner*—Jeffrey A. Gaffin
*Assistant Examiner*—Michael Sherry
*Attorney, Agent, or Firm*—Renner, Otto, Boisselle & Sklar, P.L.L.

[57] ABSTRACT

A resettable circuit interrupter device includes a circuit board support, contact pairs for selectively opening or closing a circuit, one contact of a contact pair being positioned on the support, a solenoid actuator positioned on the opposite side of the support for selectively operating the contacts, and a solenoid plunger device extending from one side of the support to the other side of the support and a contact carrier mounted on the plunger and on which a movable contact is mounted, the plunger being movable to move the movable contact into engagement with the fixed contact in response to energization by the solenoid actuator.

10 Claims, 1 Drawing Sheet

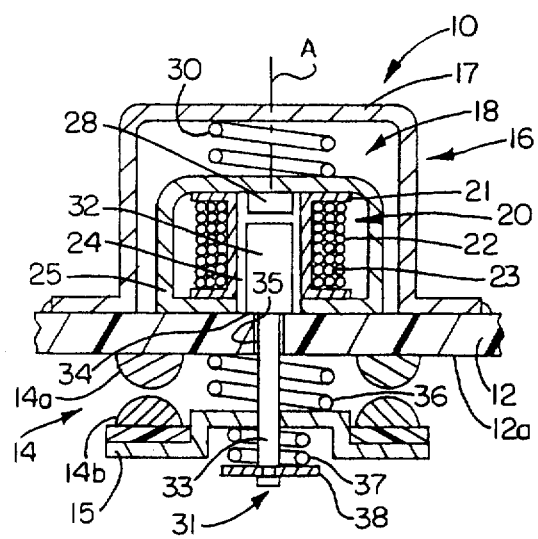
FIG. 1
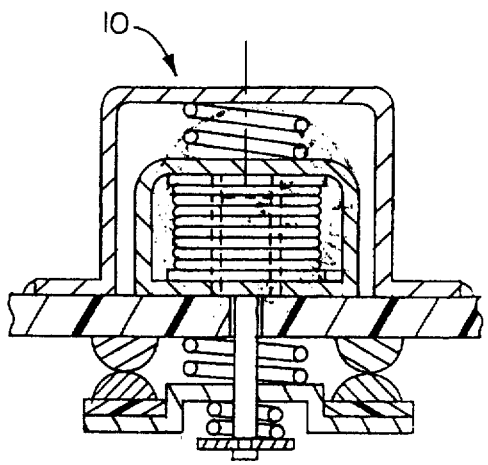
FIG. 2
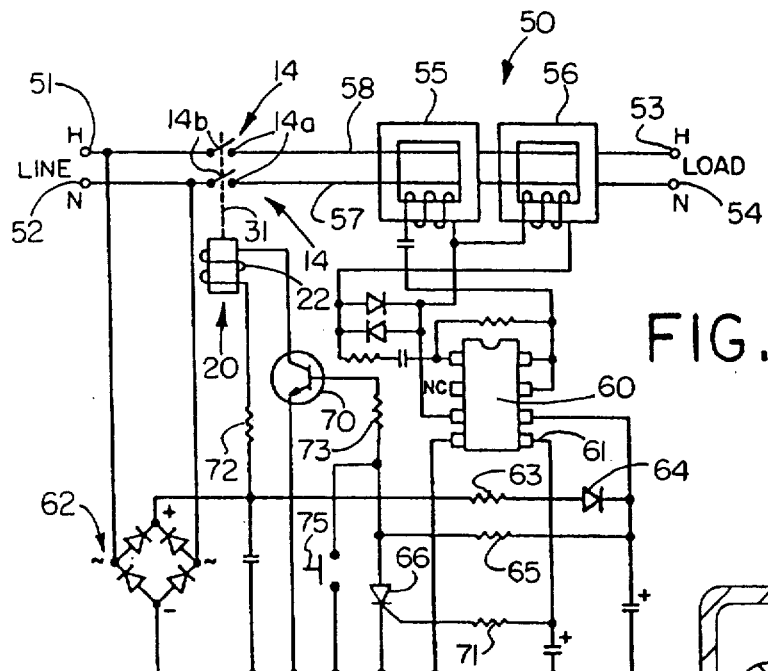
FIG. 3
FIG. 4

RESETTABLE GROUND FAULT CIRCUIT INTERRUPTER

TECHNICAL FIELD

The present invention relates generally, to switching devices used to interrupt one or more electrical circuits, and, more particularly, to ground fault circuit interrupters that open a power circuit in response to detection of a fault condition, such as a ground fault. According to the invention, the switching device, i.e., the circuit interrupter, is resettable under a specified condition, for example, when the fault condition no longer exists.

Ground fault protection devices have been used, for example, to interrupt the supply of electrical power to an electrical connector, such as an electric socket to which an electrical device, such as a power tool or other apparatus, is connected, when a ground fault has been detected. For permanent installations, such as in a wall box, ground fault protection devices usually are only required to interrupt the hot or "live" conductor in the event of a ground fault. However, in portable power equipment employing ground fault protection devices, the neutral conductor could become disconnected due to rough handling, etc. and the protective circuit de-energized. A fault current between the hot conductor and ground would then go undetected through loss of the neutral conductor. This possibility has prompted Underwriters Laboratories (U.L.) to require that non-permanently connected ground fault protective equipment in this country include means for detecting an open neutral conductor.

One means employed to detect an open neutral conductor and then, in response, to interrupt all power, includes a separate device such as a self-latching relay that will maintain load circuit continuity only so long as both hot and neutral conductors are connected. However, these relay devices tend to be bulky and expensive and awkward for use with portable equipment.

Other resettable circuit interrupt devices have utilized complicated mechanisms to set and to reset the contacts. These mechanical arrangements have tended to be complex and intricate because a safety requirement is that the device must not be capable of being reset unless a safe circuit is present. The complexity, however, tends to increase manufacturing costs and to reduce reliability.

An approach taken to simplify a resettable circuit interrupter that avoids complex mechanisms for actuating circuit connection and thereby is of relatively low cost and yet is reliable for setting and resetting of the interrupter is disclosed in U.S. Pat. No. 4,893,101. That resettable ground fault circuit interrupter includes one or more contacts mounted on a relatively fixed support and one or more corresponding contacts intended to be selectively moved to connect with or to disconnect from the first-mentioned contacts thereby selectively to close or to open respective circuits, such as a power circuit, for example, the hot line as well as the neutral line of the power circuit. The moveable contacts are mounted on and moved with a solenoid, which in turn is slidable in a housing between two respective positions at which the contacts are respectively connected or disconnected thereby respectively to close or to open the power circuit. The solenoid is mechanically biased to the open circuit position. When the solenoid is suitably energized by an electric current of at least a predetermined magnitude and when a plunger is inserted suitably far into the solenoid to become magnetically held therein, a separate mechanical bias force pulls the solenoid to its second position in the housing to connect the respective contact pairs, and, thus, to close the power circuit.

Resettable ground fault interrupters used in portable equipment tend to experience mechanical shock, e.g., due to bumping against something, and vibration as they are transported and used in the field. Such mechanical shock and vibration sometimes can loosen the various parts to reduce effectiveness of the device. Also, the weight of the solenoid itself within the device can exacerbate the possibility of damage due to mechanical shock and vibration.

In each of the mechanically actuated and electrically actuated embodiments of the resettable ground fault interrupter device of U.S. Pat. No. 4,893,101, the contacts, contact carrier, solenoid housing, solenoid, and a substantial portion of the plunger are mounted on one side of the support, thus creating a substantial weight imbalance on the support and a condition of substantial inertia having the potential to increase damage due to mechanical shock and vibration. Furthermore, in the electrically actuated version of such resettable ground fault circuit interrupter the solenoid is required to pull its own weight as well as to overcome the force of a return spring and a contact pressure spring. Therefore, the solenoid has to be suitably large to provide adequate force for the described purpose. As the solenoid size and, thus, weight increase, the possibility of damage due to mechanical shock and vibration further increases.

Thus, there is a need for a resettable ground fault circuit interrupter less subject to damage due to mechanical shock and vibration, to improve reliability in the field for and to reduce the weight and size of a resettable ground fault circuit interrupter, and to maintain the reliability while minimizing cost of a resettable ground fault circuit interrupter.

BRIEF SUMMARY OF THE INVENTION

A resettable circuit interrupter device includes a support, contacts for selectively opening or closing a circuit, the contacts being positioned relative to one side of the support, an actuator positioned relative to the opposite side of the support for selectively operating the contacts, and a movable device extending from one side of the support to the other side of the support for operating the contacts in response to actuation by the actuator.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

While particular embodiments of the invention are described herein, it will be appreciated that the scope of the invention is to be limited only by the scope of the claims.

BRIEF DESCRIPTION OF THE DRAWINGS

In the annexed drawings:

FIG. 1 is a cross section view of a resettable ground fault circuit interrupter device in accordance with the present invention shown in circuit interrupting condition;

FIG. 2 is a cross section view of the interrupter device of FIG. 1 shown in energized closed circuit condition;

FIG. 3 is a schematic electric circuit diagram of an exemplary circuit that is useful to energize an interrupter device according to the invention and also to detect a fault condition and to allow the interrupter device to switch to the circuit interrupting condition; and FIG. 4 is a cross section view of an alternate embodiment of resettable ground fault circuit interrupter device in accordance with the invention.

DETAILED DESCRIPTION

Referring, now, in detail to the drawings, wherein like referenced numerals designate like parts in the several figures, and initially to FIGS. 1 and 2, a resettable ground fault circuit interrupter device in accordance with the present invention is generally indicated at 10. The device 10 is depicted being used in a typical manner mounted on a printed circuit board 12 for use as part of a ground fault protection circuit shown in FIG. 3, which is described in greater detail below. The device 10 also may be mounted on support structures other than printed circuit boards.

The device 10 includes one or more pairs of electrical contacts 14. Each contact pair 14 includes a relatively fixed contact 14a, which is mounted on the printed circuit board or other support 12, and a relatively moveable contact 14b that is mounted on a moveable contact carrier 15, which carries the moveable contact 14b to engaged electrically connected condition with respect to the contact 14a or to disengaged open circuit relation to the contact 14a. The contacts 14a, 14b, usually would be electrically connected to respective conductors of a circuit, e.g., as a switch, to open or close the indicated circuit or conductor thereof, depending on whether or not the contacts are engaged or disengaged. In the illustrated embodiments hereof, the device 10 includes two contact pairs which can be used conveniently to switch hot and neutral conductors of a power circuit; but it will be appreciated that one contact pair or more than two contact pairs may be employed in the device 10.

Mounted on the opposite side of the support 12 from the contact pairs 14 is a contact actuating mechanism 16. The mechanism 16 closes the respective contact pairs, holds the contact pairs closed, and permits the contact pairs to open, all in response to appropriate controlled energization, de-energization and operation of an electrical circuit, such as the ground fault protection circuit shown in FIG. 3. The mechanism 16 includes a housing 17, which may be secured to the support 12 by conventional means, not shown, and a solenoid unit 18. The solenoid unit 18 preferably is moveable or slidable in the housing 17 generally in a linear fashion substantially along an axis A. The housing 17 may be rectangular, cylindrical, or some other shape which preferably is cooperative with the exterior shape of the solenoid unit 18 to provide suitable guidance of such movement along the axis A while minimizing side movement that could cause binding or resistance to movement or damage to the device 10.

The solenoid unit 18 includes a solenoid 20 formed of a bobbin 21 having a coil 22 formed of a plurality of turns of an electrical conductor, such as a wire 23 wrapped around the bobbin 21 in conventional manner. The solenoid 20 has a hollow interior passage 24 defined by walls of the bobbin 21. The passage 24 is generally of cylindrical shape and extends concentrically about the axis A. The solenoid 20 includes a metal frame 25 to complete the magnetic circuit or flux path for the solenoid. A metal footplate 28 is attached to the metal frame 25 of the solenoid 20.

As was mentioned above, the solenoid unit 18 is moveable in the housing 17. However, a spring 30 ordinarily mechanically biases or urges the solenoid unit 18 into engagement with the support 12.

Associated with the solenoid 20 is a plunger 31. The plunger preferably has a cylindrical or other suitably shaped portion 32 that fits in the passage 24 of the solenoid. The plunger 31 is moveable so that the portion 32 moves within the passage 24 along the axis A. A mounting portion 33 of the plunger 31 is located exteriorly of the solenoid 20 and, particularly, on the side of the support 12 opposite that at which the solenoid unit 18 is positioned. The contact carrier 15 is mounted on the mounting portion 33 for movement toward or away from the fixed contacts 14a depending upon whether the solenoid unit 18 is suitably electrically energized or not. The plunger 31 is magnetically responsive material such as iron or steel. Thus, the plunger is responsive to the application of a magnetic field thereto by the solenoid 20 to draw the plunger 31 into the passage 24 along the axis A from the extended condition shown in FIG. 1 to the retracted condition shown in FIG. 2. The plunger 31 is stepped at 34 from wide to narrow diameter. The step 34 cooperates with walls adjacent an opening 35 in the support 12 to prevent the plunger from being pulled through the opening 35.

A compression spring 36 (also referred to herein as a return spring) mechanically biases or urges the plunger 31 to the extended condition illustrated in FIG. 1. The spring 36 may be a coil spring, as is illustrated, or may be some other type of resilient device. In the illustrated embodiment, the spring 36 is positioned about the mounting portion 33 of the plunger 31. One end of the spring 36 confronts a surface 12a of the support 12, and the other end of the spring confronts and engages the contact carrier 15. A contact pressure spring 37, which is shown as a coil spring, but which may be another resilient device, also is concentric about the mounting portion 33 of the plunger 31. The contact pressure spring 37 is trapped between the contact carrier 15 and a stop, such as a clip, retaining spring washer, etc. 38 that is attached to the plunger 31.

When the device 10 is de-energized, i.e., when the solenoid 20 does not have any current flowing in it or whatever current is flowing in it is inadequate to draw the plunger 31 into the solenoid to a to retain the plunger 31 in the retracted condition shown in FIG. 2, the spring 36 urges the plunger to the extended condition shown in FIG. 1. The spring 36 acts directly against the contact carrier 15, in turn acting against the contact pressure spring 37, in turn acting against the retaining spring washer 38. Thus, in such de-energized condition of the device 10, the contact pairs 14 are open. When a suitable current is supplied to the wire 23 of the solenoid 20, the plunger 31 is drawn in toward the retracted condition of FIG. 2 against the force of the return spring 36. More specifically, the magnetic field created by the solenoid coil 22 draws the plunger along the axis A in an upward vertical direction relative to the illustration of FIG. 2 (reference to direction is only for convenience of description and is not intended to be limiting). The washer 38 acts against the contact pressure spring 37 to urge the contact carrier 15 toward the support 12, thus compressing the return spring 36. When the plunger 31 is drawn into the solenoid coil 22 a suitable distance to achieve the retracted condition of FIG. 2, respective contact pairs 14 close to close or to complete respective circuits. The plunger 31 may be drown into the solenoid coil 22 more than the distance required for the contact pairs 14 to begin just touching. Such additional movement of the plunger into the solenoid coil 22 and bobbin 21 is permitted by the contact pressure spring 37, which assures that an appropriate contact pressure is maintained between the respective contacts of each contact pair as the plunger is drawn further into the solenoid coil 22 and allows for such extra travel. Travel of the plunger 31 into the solenoid coil 22 is stopped by the footplate 28. When the plunger 31 engages the footplate 28, the two are magnetically coupled.

The current conducted by the solenoid coil must exceed a predetermined value so that the magnetic coupling between the plunger 31 and footplate 28 is great enough to exceed the force of the spring 36, tending to separate them. If the current falls below the minimum holding level (allowing for possible hysteresis), the spring 30 causes separation of the plunger 31 and footplate 28 thereby causing the device 10 to return to the de-energized state shown in FIG. 1. An exemplary air gap between the plunger 31 and footplate 28 may be slightly larger, on the order of about 0.01 inch, than the normally open spacing between contacts 14a, 14b. This assures that upon closing of contacts 14a, 14b spring 37 will compress slightly and maintain a constant tension on contacts 14a, 14b to eliminate contact bounce.

The plunger 31 preferably is drawn into the solenoid coil 22 adequately far so that slight outward movement of the plunger toward the extended condition of FIG. 1 can be tolerated as the device 10 may be mechanically shocked, vibrated, etc. while the contact pressure spring 37 continues to act through the contact carrier 15 maintaining the respective contact pairs 14 closed. The spring 30 also permits slight movement of the solenoid unit 18 in the housing 17, even while the solenoid 20 is energized to protect the solenoid unit 18 from damage from a mechanical shock, vibration, etc. Still further, the spring 30 allows movement of the solenoid unit 18 in the event the plunger 31 is urged into engagement with the confronting top wall (relative to the illustration of FIGS. 1 and 2; reference to direction is for convenience only and is not intended to be limiting on the invention).

Such additional travel of the plunger may be due to excessive energization of the solenoid coil in combination with inertia of the plunger, application of a mechanical force to the plunger 31 pushing it into the housing 17 along axis A, etc.

Upon de-energization of the solenoid coil 22, for example, upon the detection of a fault condition by the circuit shown in FIG. 3, the magnetic force holding the plunger in the retracted condition is terminated or is substantially reduced. In such case, the return spring 36 urges the plunger to the extended condition of FIG. 1 and, thus, opens respective contact pairs.

During operation of the interrupter device 10, the current conducted by the solenoid coil 22 must exceed a predetermined value so that the magnetic coupling between the plunger 31 and the solenoid 20 is great enough to exceed the force of the return spring 36, which tends to separate the contact pairs and to urge the plunger to the extended condition of FIG. 1. If the current falls below the minimum holding level to hold the plunger 31 withdrawn preferably against the footplate 28 (allowing for possible hysteresis), the return spring 36 causes movement of the plunger 31 toward the extended condition thereby causing the device 10 to return to the de-energized extended condition shown in FIG. 1.

The device 10 can be reset only upon the supplying of sufficient current to the solenoid coil 22. This precondition is satisfied by the circuitry in FIG. 3, for example, which provides the needed solenoid coil 22 current only when it is electrically safe to permit closure of the contact pairs 14; or interrupts the solenoid current when an unsafe condition occurs (such as a ground fault) thereby de-energizing the device 10. It will be appreciated that the current required to actuate the solenoid to draw the plunger 31 sufficiently far into the solenoid to close the contact pairs 14 is determined by the selection of the return spring 36, such as the force constant and length thereof.

In operation, the device 10 of FIGS. 1 and 2 is connected in the ground fault protection circuit 50 of FIG. 3. More particularly, in the circuit 50 line terminals 51, 52 representing "hot" and "neutral" lines are intended for connection to a conventional AC electrical outlet to receive electrical power therefrom. Power is provided through the terminals 51, 52 and respective contact pairs 14 of the interrupter device 10 to terminals 53, 54 that are connected in turn to a protected piece of power equipment (not shown). A pair of current transformers 55, 56 are provided to sense, respectively, continuity in the neutral line 57 (no continuity indicates a fault) and current flow between the hot line 58 and ground, indicating a ground fault. If any such fault is sensed by either transformer 55 or 56, a signal is provided to an integrated circuit 60, which in turn provides a signal on an output pin 61 thereof indicating that a ground fault has been sensed. An exemplary integrated circuit 60 is a GFCI controller manufactured by Raytheon as part No. RV4145.

Power is supplied to the ground fault protection circuit 50 from terminals 51, 52 through a bridge rectifier 62. The output of the bridge 62 is supplied through resistor 63 and diode 154 to the integrated circuit 60 and through a resistor 65 to the cathode of an SCR 66 (or other switching device). The gate electrode of the SCR (or the control input to another switching device) is connected via a resistor 71 to the output 61 of the integrated circuit 60. The SCR 66 remains non-conductive so long as no ground fault signal is received from the output 61 of the integrated circuit 60.

The solenoid coil 22 of the solenoid 20 in the circuit interrupter device 10 is connected to the output of the bridge 62 through a current limiting resistor 72 and is connected to ground through the transistor 70. The transistor 70 is normally conductive by means of current supplied through resistor 73 and resistor 65, which are in turn coupled to the positive side of the bridge 62 via the resistor 63 and diode 64. With transistor 70 conductive, the solenoid coil 22 of the device 10 is supplied with current through current limiting resistor 72 which limits the current to an amount sufficient to draw in the plunger 31 to close the respective contact pairs 14 against the force of the return spring 36 and to maintain the contact pairs closed. The solenoid coil 22 is supplied with sufficient pull-in current through the transistor 70 and the contact pairs 14 are closed as soon as line terminals 51 and 52 are plugged into a power source.

If a fault is detected by either transformer 55 or 56, a signal is provided to the integrated circuit 60 which in mm provides a signal at the output 61 to the gate of the SCR 66. The SCR 66 is thereby rendered conductive and diverts current from the base of the transistor 70 rendering it non-conductive. The solenoid coil of the device 10 is thus de-energized and the contact pairs 14 are opened. The device 10 can be reset only by manual actuation of the push-button switch 75 or by turning off the power to the line terminals 51 and 52 and then re-initiating such power. When a ground fault is detected, a signal at the output 61 of the integrated circuit 60 is provided to the gate of the SCR 66 causing the SCR to become conductive and divert base current from the transistor 70. The coil of the device 10 then becomes de-energized and the contact pairs 14 become open. So long as line terminals 51 and 52 remain connected to a power source, the SCR 66 will remain conductive. The transistor 70, however, will remain non-conductive and the device 10 will be de-energized.

The device 10 can be reset by operating a reset push button switch 75 to render the SCR 66 non-conductive and to permit pull-in current to be supplied to the solenoid coil 22 of the device 10 through the transistor 70. If the line terminals 51 and 52 are disconnected from the power source following detection of a ground fault, the SCR 66 will be rendered non-conductive. In that case, pull-in current will be supplied to the solenoid coil 22 of the device 10 as soon as line terminals 51 and 52 are reconnected to an appropriate power source. Thus, in the event that the power supplied the line terminals 51 and 52 is temporarily cut-off and then re-initiated, the interrupter device 10 of the invention will be reset automatically without the need to press the push-button switch 75.

Since the contact pairs are located on the opposite side of the support from the solenoid unit 18 only the plunger, contact carrier and moveable contacts 14b have to be moved during operation of the solenoid 20. Thus, the solenoid 20 does not have to move its own weight, and, therefore, it does not have to be as strong as those required in the past, for example, as is disclosed in U.S. Pat. No. 4,893,101. Since the solenoid can be smaller, damage to the device 10 from mechanical shock, or vibration is reduced. Also, force applied to the plunger 31 in the event of a movement of the solenoid unit 18 off axis A will be minimized. Since the solenoid does not have to pull its own weight, it does not require as much power as was required in prior ground fault interrupter devices.

Another advantage of the invention is the contacts are easily exposed for replacement, if necessary, since the contact carrier 15 can be easily removed from the plunger 31 after the spring washer 38 is removed.

The invention described herein thus achieves a resettable circuit interruption capability that does not require any mechanical linkage between a push button and contacts. Resetting easily can be accomplished by disconnecting and reconnecting power. Resetting also can be effected easily by manually closing the push button switch 75 or by providing an electronic or automatic mechanism to provide the effect of terminating current flow through the SCR 66. A minimum number of moving parts in the invention greatly simplifies manufacture and assembly thereby reducing the cost and increasing reliability over prior devices.

Briefly referring to FIG. 4, an alternative embodiment of resettable ground fault interrupter device 10' is illustrated. In FIG. 4 primed reference numerals designate parts that are similar to those designated by unprimed parts in FIGS. 1 and 2. The only difference between the device 10' of FIG. 4 and the device 10 of FIGS. 1 and 2 is that the solenoid unit housing 25' is positioned between a spring 30' and a further spring 80 so as to float in a sense, in the housing 17'. By permitting the solenoid unit 18' to float, it becomes even less subject to damage in the event that the device 10' is bumped against another device or dropped on the floor, etc. The functioning of the device 10' otherwise is substantially the same as the functioning of the device 10 described above with reference to FIGS. 1, 2 and 3.

While the invention has been shown and described with respect to particular embodiments thereof, this is for the purpose of illustration rather than limitation, and other variations and modifications of the specific embodiments herein shown and described will be apparent to those having ordinary skill in the art within the intended spirit and scope of the invention. Accordingly, the patent is not to be limited in scope and effect to the specific embodiments shown herein and described nor in any other way that is inconsistent with the extent to which the progress in the art has been advanced by the invention. The invention is to be limited only by the following claims and the equivalents thereof.

I claim:

1. A resettable circuit interrupter device, comprising a support, contact means for selectively opening or closing a circuit, said contact means being positioned relative to one side of said support, a solenoid positioned relative to the opposite side of said support for selectively operating said contact means, and movable means extending from one side of said support to the other side of said support for operating said contact means in response to actuation by said solenoid, and resilient means for urging said solenoid to a prescribed location in a housing, said resilient means also affording for slight movement of the solenoid.

2. The device of claim 1, said contact means comprising at least one pair of electrical contacts.

3. The device of claim 2, wherein at least one electrical contact of at least one pair of electrical contacts is positioned in relatively fixed location relative to said support and wherein the other electrical contact is movable relative to said one electrical contact.

4. The device of claim 3, further comprising a contact carrier for carrying the movable electrical contact to connection with and disconnection from said one electrical contact.

5. The device of claim 3, further comprising a return spring for urging the movable electrical contact away from said one electrical contact.

6. The device of claim 1, said solenoid comprising a solenoid coil, and a housing.

7. The device of claim 6, said resilient means being positioned in said housing to urge said solenoid coil toward said support.

8. The device of claim 1, further including an energizing means for energizing said solenoid, wherein said energizing means includes a ground fault protection circuit.

9. A resettable circuit interrupter device, comprising a support, contact means for selectively opening or closing a circuit, said contact means including at least one pair of electrical contacts and being positioned relative to one side of said support, wherein:

at least one electrical contact of at least one pair of electrical contacts is positioned in relatively fixed location relative to said support and wherein the other electrical contact is movable relative to said one electrical contact, a contact carrier for carrying the movable electrical contact to connection with and disconnection from said one electrical contact, a return spring for urging the movable electrical contact away from said electrical contact, a solenoid positioned relative to the opposite side of said support for selectively operating said contact means, movable means extending from one side of said support to the other side of said support for operating said contact means in response to actuation by said solenoid, and a contact pressure spring for maintaining closing pressure of the movable electrical contact against one electrical contact over a range of movement of said movable means.

10. A resettable circuit interrupter device, comprising a support, contact means for selectively opening or closing a circuit, said contact means being positioned relative to one side of said support, a solenoid positioned relative to the opposite side of said support for selectively operating said contact means, said solenoid comprising a solenoid coil, a housing, said solenoid coil being mounted for sliding movement in said housing, and resilient means for urging said solenoid coil to a prescribed location in said housing, said resilient means being positioned in said housing to urge said solenoid toward said support, said resilient means including a further resilient means for urging said solenoid coil away from said support, and movable means extending from one side of said support to the other side of said support for operating said contact means in response to actuation by said solenoid.

* * * * *